May 4, 1948.　　　G. D. SYMER　　　2,441,087
CONTROL SURFACE COVER
Filed May 11, 1945　　　2 Sheets-Sheet 1
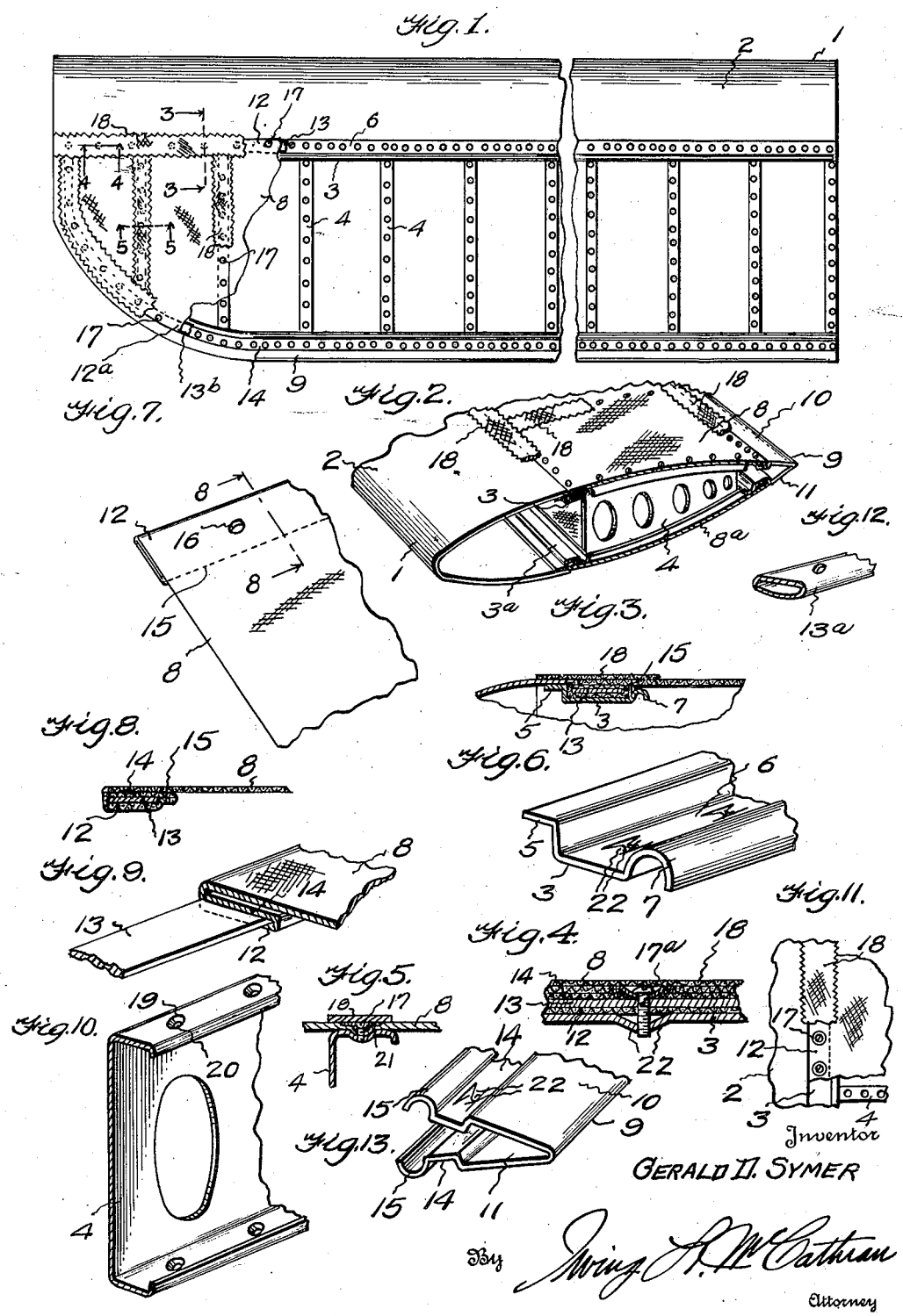
Inventor
GERALD D. SYMER
By Irving H. McCathran
Attorney May 4, 1948.                    G. D. SYMER                    2,441,087
                            CONTROL SURFACE COVER
                       Filed May 11, 1945           2 Sheets-Sheet 2
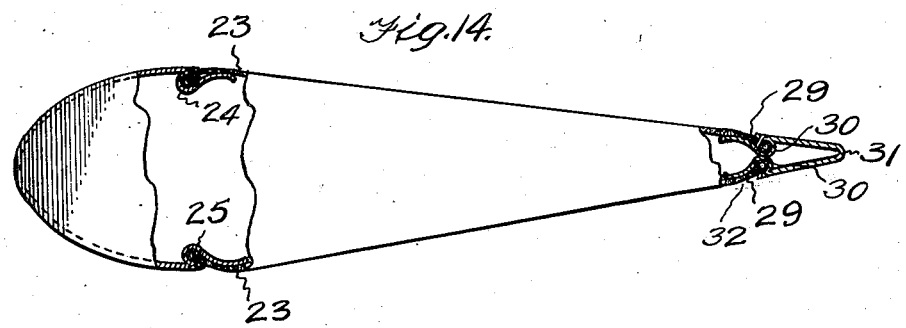
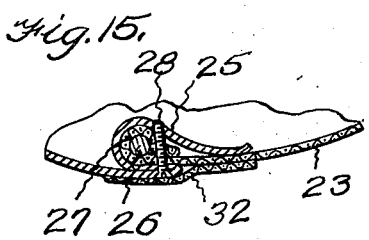
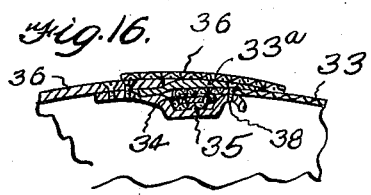     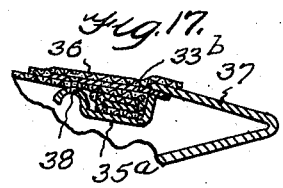
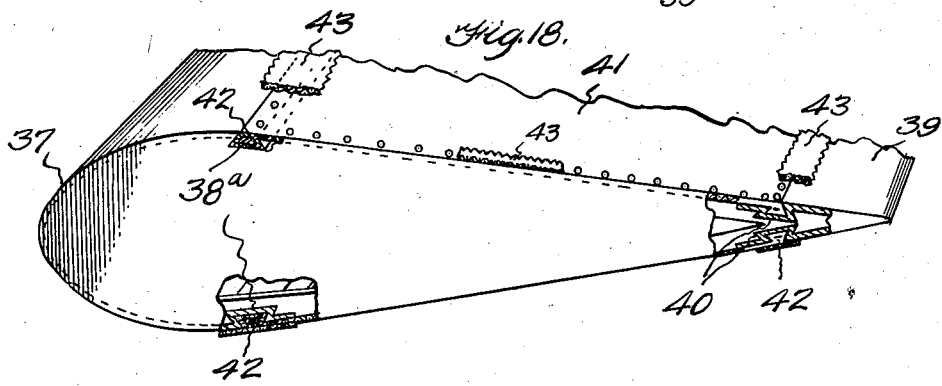
Inventor
GERALD D. SYMER
By
Attorney Patented May 4, 1948

2,441,087

UNITED STATES PATENT OFFICE 2,441,087

CONTROL SURFACE COVER

Gerald D. Symer, Greenbelt, Md.

Application May 11, 1945, Serial No. 593,242

2 Claims. (Cl. 244—132)

This invention relates to a control surface cover, and more particularly to the means for securing and locking in place the fabric covering for airplane surfaces.

One of the important objects of this invention is the production of a simple and efficient means for quickly and securely attaching the cover, skin or fabric sheet to an airplane surface so as to eliminate the tedious stitching or sewing which is usually employed when so attaching the cover in place.

A further object of this invention is the production of a simple and efficient cover or skin, the leading end trailing edges of which are prepared in advance of attachment so that the cover or skin may be quickly placed in anchored position upon the airplane surface with a minimum amount of effort.

Other objects and advantages of the present invention will appear throughout the following specification and claims.

In the drawings:

Figure 1 is a top plan view partly broken away, of a wing or other portion of an airplane having a control surface;

Figure 2 is a fragmentary sectional perspective view of an airplane wing illustrating one form of my invention;

Figure 3 is an enlarged sectional view taken on line 3—3 of Figure 1;

Figure 4 is an enlarged longitudinal sectional view taken on line 4—4 of Figure 1;

Figure 5 is a transverse sectional view taken on line 5—5 of Figure 1;

Figure 6 is a fragmentary perspective view of one of the anchoring channels;

Figure 7 is a perspective view of a portion of the cover or skin;

Figure 8 is an enlarged transverse sectional view taken on line 8—8 of Figure 7;

Figure 9 is a sectional perspective of a portion of the cover or skin illustrating the anchoring strip and manner of attaching the cover or skin to the strip before stitching;

Figure 10 is a fragmentary sectional perspective view of one of the ribs;

Figure 11 is an enlarged top plan view of a portion of the wing illustrating the manner of anchoring the cover or skin in position;

Figure 12 is a fragmentary sectional perspective view of one form of anchoring strip;

Figure 13 is a fragmentary perspective view of the trailing edge of the wing or other portion of an airplane;

Figure 14 is a transverse sectional view partly in elevation of an airplane wing illustrating a modified form of fastening means;

Figure 15 is an enlarged transverse sectional view illustrating the anchoring means shown in Figure 14;

Figure 16 is an enlarged transverse sectional view illustrating a further modified means for anchoring the cover to the leading edge of a wing and the like;

Figure 17 is a similar view illustrating a similar means shown in Figure 16 for anchoring the cover to the trailing edge;

Figure 18 is a perspective view partly in section illustrating a further type of anchoring means.

By referring to the drawings by numerals it will be seen that 1 designates a wing, or other portion of an airplane and the like, wherein a control surface is used. It should be understood at the outset that the present invention is adaptable for use upon any control surface, such as ailerons, elevators, rudders, and the like, without departing from the spirit of the invention. In the structure illustrated, the leading edge 2 is of the conventional design, and anchoring channels 3 and 3ᵃ engage and are secured to the rear margins of the leading edge 2 in any suitable or convenient manner, such for instance as being fixed to the ribs 4. The leading edge 2 is formed of metal or other material common to the trade.

The channel 3 is provided with a straight longitudinal flange 5, which preferably extends under the rear margin of the leading edge 2. The body of the channel 3 is inset from the flange 5 to provide a longitudinally extending straight depression 6. The opposite edge of the channel 3 is provided with a rolled flange 7 which extends parallel to the flange 5 to provide a rest for the fabric upper and lower covers or skins 8 and 8ᵃ and to reduce wear thereon to a minimum. The channel 3 is secured to the upper rear margin of the leading edge 2 whereas the channel 3ᵃ, constructed similarly to the channel 3, is secured to the lower rear margin of the leading edge 2.

In carrying out my invention, I preferably employ a specially designed trailing edge 9 which may be made of metal or other rigid material. This trailing edge may be shaped as to its longitudinal contour to provide the desired design, such for instance as that shown in Figure 1. This trailing edge 9 is preferably V-shaped in cross section and having diverging flanges 10 and 11 extending forwardly thereof, as shown in detail in Figure 13. Each flange 10 and 11 is provided with a longitudinally extending depressed channel 14 in its outer face terminating in an outwardly raised rolled flange 15 along the inner or forward margin of the trailing edge 9. The channel 14 in the upper flange 10 provides an anchoring channel for the rear edge of the upper cover or skin 8, whereas the channel 14 of the lower flange 11 provides an anchoring channel for the rear edge lower cover 8ª.

The cover or skin 8, which is preferably formed of fabric common to the trade, is first shaped to fit the desired surface and a hem, casing or fold 12 is made along the marginal forward and rear edge of the cover to encase and fit snugly around an anchoring strip 13, the extremity 14 of the fabric of the cover 8 being folded around the strip 13 as shown. The cover 8 is then stitched, as at 15, close to the inner edge of the strip 13, as shown in Figures 7 and 8, to firmly encase the strip 13. A strip 13ª having the transverse contour as shown in Figure 12, may be used in place of the strip 13 if desired. The hem or casing 12 and the strip 13 are preferably apertured as at 16, through which suitable anchoring means such as screws may extend to hold the strip 13 in anchored position in the channel 3. An anchoring strip 13ᵇ similar to the strip 13 is secured within the hem 12ª and strip 13ᵇ are of a proper longitudinal contour to fit into the channel 14 of the upper flange 10 of the trailing edge 9. The cover or skin 8 is fixed to the ribs 4, and the strips 13 and 13ᵇ are anchored or secured in the channels 6 and 14 respectively, by means of suitable screws or other fastening means 17. In all of these cases, a length of fabric seam-tape 18, of the proper width, is attached, preferably with a well-known airplane "dope" to the outer surface of the fabric so as to cover the points of connection of the cover with the ribs and leading and trailing edges. This will leave the wing or other structural frame with a substantially uninterrupted, smooth, flush surface. The side edges of the seam-tape or sealing tape is preferably pinked, as shown. The bottom cover or skin 8ª is secured in a manner similar to that described above.

There are many ways in which the cover or skin may be secured to the ribs 4 or within the channels 6 and 14. One method is shown in Figures 5 and 10. In this form, the flanges of the rib 4 are provided with depressed or countersunk nipples 19 having threaded apertures 20 into which the screws 17 are threaded after passing through the fabric. Countersunk washers 21 are preferably fitted over the fabric to receive the heads of the screws, and these washers 21 force the fabric down into the nipples 19 to provide a secure anchoring means.

The type of fastening illustrated in Figures 4 and 6 may be used both in the channels and upon the ribs and the means for fastening may be interchanged or substituted one for the other, that is to say, either the form shown in Figure 4 or Figure 5, without departing from the spirit of the invention. As shown in Figures 4, 6 and 13, a threaded aperture of the "speed nut" type may be used, if desired, wherein two opposed threaded tongues 22 are employed for receiving the threaded end of the screw 17ª similar to the screw 17. It is not desired to limit the present invention to any particular type of fastening, but the forms illustrated have been found efficient.

In the form shown in Figure 14, I have shown a modified form of anchoring means for the forward and rear edges of the upper and lower covers or skins 23. In this form the leading edge is provided with upper and lower under cut channels 24 and 25 in which the forward edges of the covers 23 are fitted. The edge of each cover 23 is preferably provided with a rod 26 circular in cross-section fitted within a hem 27. The rod and hem extend along the length of the forward edge of the cover. Suitable retaining screws 28 span the channels 24 and 25 in the manner shown in Figures 14 and 15 to seal these channels and to hold the forward edges of the cover in anchored position.

The rear edges 29 of the covers or skins 23 are locked or anchored in channels 30 of the trailing edge 31 in a manner similar to the channels 24 and 25. A sealing tape 32 may be used to seal these channels in a manner similar to that described above.

In Figures 16 and 17 there is shown a further modified means for anchoring the forward and rear edges of the cover 33, which edges carry anchoring strips 34. These strips 34 fit in channels 35 carried by the leading and trailing edges 36 and 37. Suitable anchoring screws 38 pass through the cover 33 and through the metallic retaining strip 33ª beyond the channels 35 in the direction of pull to hold the strips 34 in the anchoring channels 35. Suitable sealing tape 36 covers these channels 35.

The metallic retaining strip 33ª has one end fitting under the leading edge 36, as shown in Figure 16, while the retaining screw 38 anchors the opposite edge in position. A similar retaining strip 33ᵇ has one edge anchored by the screw or screws 38 and the opposite edge fits under the trailing edge 37 and preferably extends through an aperture formed in the rear channel 35ª.

In Figure 18 there is shown a still further modified form of anchoring means, wherein the leading edge 37 is provided with upper and lower dove-tail or keystone channels 38ª extending along the rear margin of the leading edge 37. The trailing edge 39 is provided with similar dove-tail or keystone channels 40. The forward and rear edges of the cover or skin 41 are provided with dove-tail or keystone strips 42 fitted in suitable hems or casings of the fabric cover. These strips 42 are slipped in endwise of the channels 38ª and 40 and the cover 14 and strips are then secured in any desired manner. A suitable sealing tape 43 is used to cover all joints, as shown.

It should be understood that the fabric skin or cover is preformed and preshaped, and that the anchoring strip is fixed within the hem or casing along the forward and rear edges of the skin or cover prior to placing the skin or cover in position. Consequently, the skin or cover may be rapidly placed in position with a minimum effort, and the skin or cover is then fixed within the anchoring channel or channels by the securing elements.

Because of the structure illustrated and described, it will not be necessary to remove the control surface from the plane to which it is attached, since the cover may be applied while the control surface is still carried by or attached to the plane.

Having described the invention, what is claimed as new is:

1. A prefabricated trailing edge section for aircraft structure comprising upper and lower forwardly extending and diverging flanges, each flange having a longitudinally extending anchoring channel near its forward edge for receiving an anchoring strip of a surface cover to anchor a surface cover upon the trailing edge section.

2. An aircraft structure comprising a frame structure having a channel dove-tail in cross-section formed therein, said channel having an open side and one open end, a flexible cover for said frame structure, a rigid member having a dove-tail formation in cross-section fixed at the margin of said cover and fitting longitudinally in said channel for retaining said member in said channel and anchoring the margin of said cover in the channel, said dove-tail formation of said rigid member and channel preventing the removal of the rigid member through the open side of the channel and permitting the removal of the rigid member longitudinally through the open end of said channel.

GERALD D. SYMER.

REFERENCES CITED

The following references are of record in the file of this patent:

UNITED STATES PATENTS

| Number | Name | Date |
|---|---|---|
| 1,331,150 | Hooper | Feb. 17, 1920 |
| 1,773,747 | Nebhut | Aug. 26, 1930 |
| 1,886,708 | Markey | Nov. 8, 1932 |
| 2,165,459 | Seversky | July 11, 1939 |
| 2,237,275 | Koppen | Apr. 1, 1941 |
| 2,343,505 | Gedris | Mar. 7, 1944 |

FOREIGN PATENTS

| Number | Country | Date |
|---|---|---|
| 124,966 | Great Britain | Apr. 10, 1919 |